United States Patent
Pond et al.

[11] Patent Number: 6,095,663
[45] Date of Patent: Aug. 1, 2000

[54] COMBINATION CLEARANCE AND MARKER LIGHT ASSEMBLY

[75] Inventors: Gregory Pond, Jamestown; Chris Allen Suckow, Kennedy, both of N.Y.

[73] Assignee: Truck-Lite Co., Inc., Falconer, N.Y.

[21] Appl. No.: 08/887,431

[22] Filed: Jul. 2, 1997

[51] Int. Cl.[7] .................................................. F21V 7/00
[52] U.S. Cl. ........................ 362/247; 362/240; 362/485; 362/545; 362/800
[58] Field of Search ................................. 362/257, 485, 362/509, 514, 543, 544, 545, 240, 241, 247, 800

[56] References Cited

U.S. PATENT DOCUMENTS

| | | | |
|---|---|---|---|
| 4,893,111 | 1/1990 | Roller | 340/471 |
| 4,975,814 | 12/1990 | Schairer | 362/240 |
| 5,093,768 | 3/1992 | Ohe | 362/241 |
| 5,471,371 | 11/1995 | Koppolu et al. | 362/32 |
| 5,490,049 | 2/1996 | Montalan et al. | 362/240 |
| 5,567,036 | 10/1996 | Theobald | 362/80 |
| 5,585,783 | 12/1996 | Hall | 340/473 |
| 5,769,532 | 6/1998 | Sasaki | 362/237 |

*Primary Examiner*—Sandra O'Shea
*Assistant Examiner*—Peggy A. Neils
*Attorney, Agent, or Firm*—The Bilicki Law Firm, P.C.

[57] ABSTRACT

A light assembly, comprising a planar substrate containing a plurality of light sources mounted perpendicularly thereto, each of the light sources operatively arranged to emit light outwardly from the source at a solid first angle which is less than $2\pi$ steradians, and, a light directing element mounted to the planar substrate and operatively arranged to direct the light emitted from each of the plurality of light sources into a beam which subtends from the source at a second angle which is greater than the first angle in at least two dimensions. In a preferred embodiment of the light assembly, the light directing element is a reflector. The light assembly of the subject invention is especially suited for use as combination of a truck clearance and marker light assembly.

20 Claims, 9 Drawing Sheets

COMBINATION CLEARANCE AND MARKER LIGHT ASSEMBLY

FIELD OF THE INVENTION

This invention relates generally to light assemblies, more particularly to light assemblies for tractor-trailers, and, still more particularly, to an LED (light-emitting diode) combination clearance and marker light assembly.

BACKGROUND OF THE INVENTION

The Society of Automotive Engineers (SAE) publishes many new, revised, and reaffirmed standards each year in three categories, including Ground Vehicle Standards (J-Reports). Information on these standards is available on the World Wide Web at http://www.sae.org. SAE standard J592 defines a clearance lamp as a lamp mounted on the permanent structure of a vehicle as near as practicable to the upper left and right extreme edges to indicate the overall width and height of the vehicle. The standard also defines a side marker lamp as a lamp which shows to the side of the vehicle, mounted on the permanent structure of the vehicle as near as practicable to the front and rear edges to indicate the overall length of the vehicle. A combination lamp is defined by the standard as a single lamp which simultaneously fulfills the requirements of clearance and side marker lamps. The standard also specifies certain photometric requirements for these lamps, including candela requirements, as well as locations at which the requirements shall be taken relative to the vehicle.

A combination lamp is mounted at a 45° horizontal angle to the direction of travel of the vehicle, and yet must meet the marker lamp visibility requirements to the front and side of the vehicle. A specified amount of light is required to be visible from +90° to −90° relative to the axis of the lamp.

Typically, clearance, side marker and combination lamps used on vehicles use high-intensity incandescent bulbs and optical lenses to meet the photometric requirements. There are several drawbacks to using incandescent bulbs. First, filaments burn out regularly, jeopardizing safety. Secondly, bulbs mounted in sockets are subjected to vibrations which tend to break the filaments and occasionally break the electrical circuit. Finally, incandescent bulbs consume a fair amount of electrical energy, especially when used in large numbers as on a tractor-trailer.

Heretofore, light emitting diodes (LEDs) have not been generally used as clearance, marker or combination lamps. There are two reasons for this. First, LEDs have not traditionally been bright enough for this use. Secondly, LEDs emit light in a narrow cone, and thus require lens optics to distribute the light into a 180° pattern to meet SAE standards.

One example of an apparently successful use of LEDs in clearance and side marker lamps is disclosed in U.S. Pat. No. 5,567,036 (Theobald et al.). This patented invention uses a plurality of LEDs mounted on three circuit boards arranged in three planes, in combination with a lens assembly to spread the light in an approximate arc of 180°. There are several disadvantages associated with this solution to the problem. Mounting LEDs on different circuit boards and in different planes is costly, and can cause the lamp's components to break free during Department of Transportation required vibration tests. Furthermore, encapsulation of components within LED lamps is common, and having LEDs mounted in different planes can make it extremely difficult to encapsulate components without covering the LED body such that light output is affected. Also, lens optics are not especially efficient at redirecting light to extreme angles.

What is needed, then, is an LED combination lamp assembly which meets SAE standards, and yet comprises all LEDs mounted on a single circuit board in a single plane and uses reflectors rather than optics to direct the light where needed to meet the requirements of the standard.

SUMMARY OF THE INVENTION

The invention broadly comprises a planar substrate containing a plurality of light sources mounted perpendicularly thereto, each of the light sources operatively arranged to emit light outwardly from the source at a solid first angle which is less than $2\pi$ steradians, and, a light directing element mounted to the planar substrate and operatively arranged to direct light emitted from the plurality of light sources into a beam which subtends from the sources at a second angle which is greater than the first angle.

A primary object of the invention is to provide a light assembly which meets SAE standards, and yet comprises all LEDs mounted on a single circuit board in a single plane and uses reflectors rather than optics to direct the light where needed to meet the requirements of the standard.

This, and other, objects, features and advantages of the present invention will become readily apparent to one having ordinary skill in the art upon a reading of the following detailed description of the invention, the attached drawings, and appended claims.

DETAILED DESCRIPTION OF THE PREFERRED EMBODIMENT

At the outset, it should be clearly understood that like reference numerals are intended to identify the same structural elements, portions or surfaces consistently throughout the several drawing figures as such elements, portions or surfaces may be further described or explained by the entire written specification, of which this detailed description is an integral part. Unless otherwise indicated, the drawings are intended to be read together with the specification, and are to be considered a portion of the entire "written description" of this invention.

Figure 1:
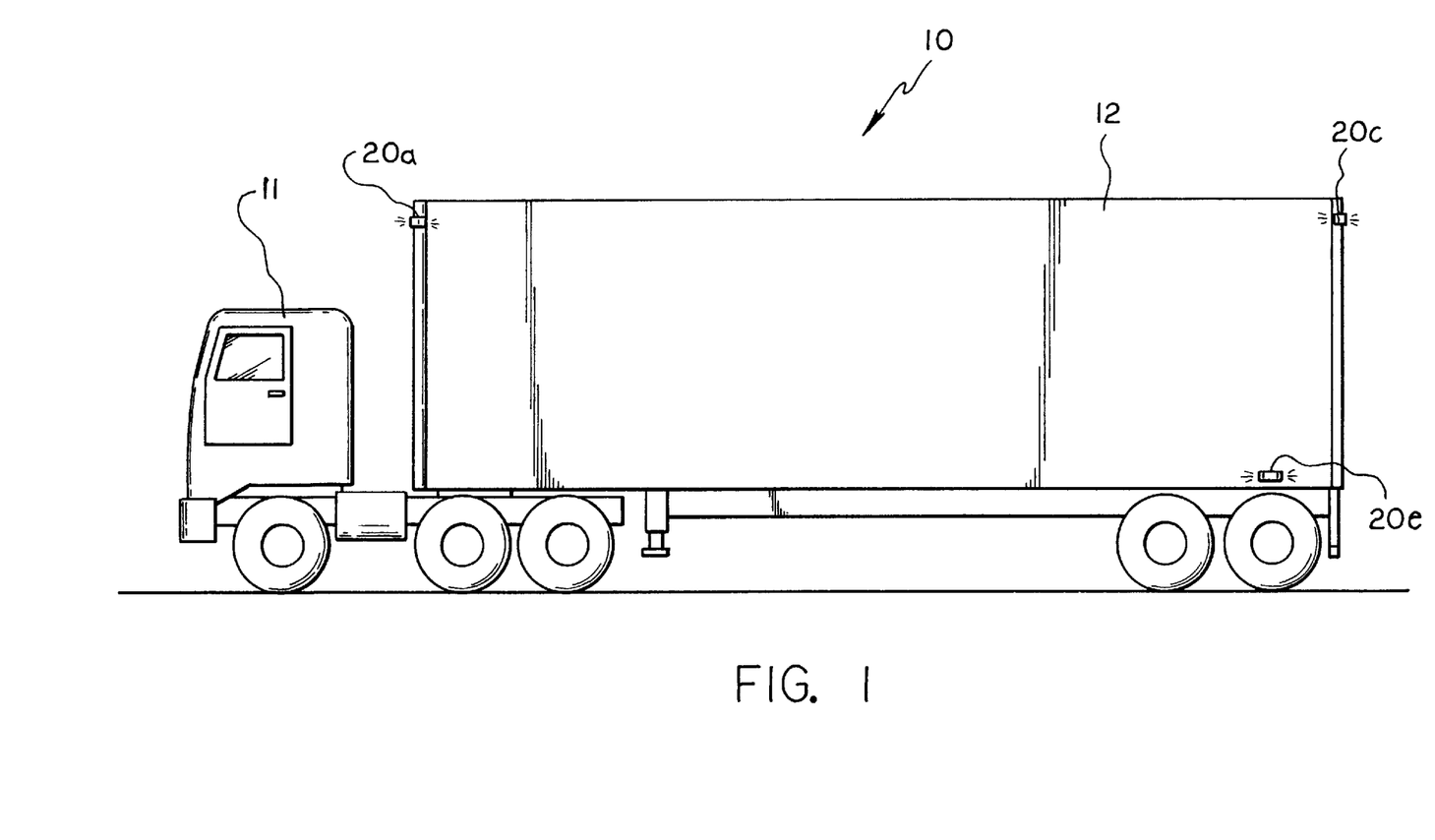
FIG. 1 is side view of a tractor-trailer combination, illustrating the placement of the marker, clearance combination light assembly of the present invention.

FIG. 1 illustrates in side view a typical tractor-trailer vehicle. It should be understood at the outset that the subject invention is not limited in utility to tractor-trailers. In fact, the invention is not even limited in application to vehicle lighting, although this is obviously a preferred use. Tractor-trailer 10 comprises tractor 11 and trailer 12. The combination light assembly can be mounted in various locations on the trailer as shown. For example, to meet SAE standards, light assemblies 20a and 20c are placed proximate the upper corners of the trailer and light assembly 20e is placed along the lower rear edge of the trailer.

Figure 2:
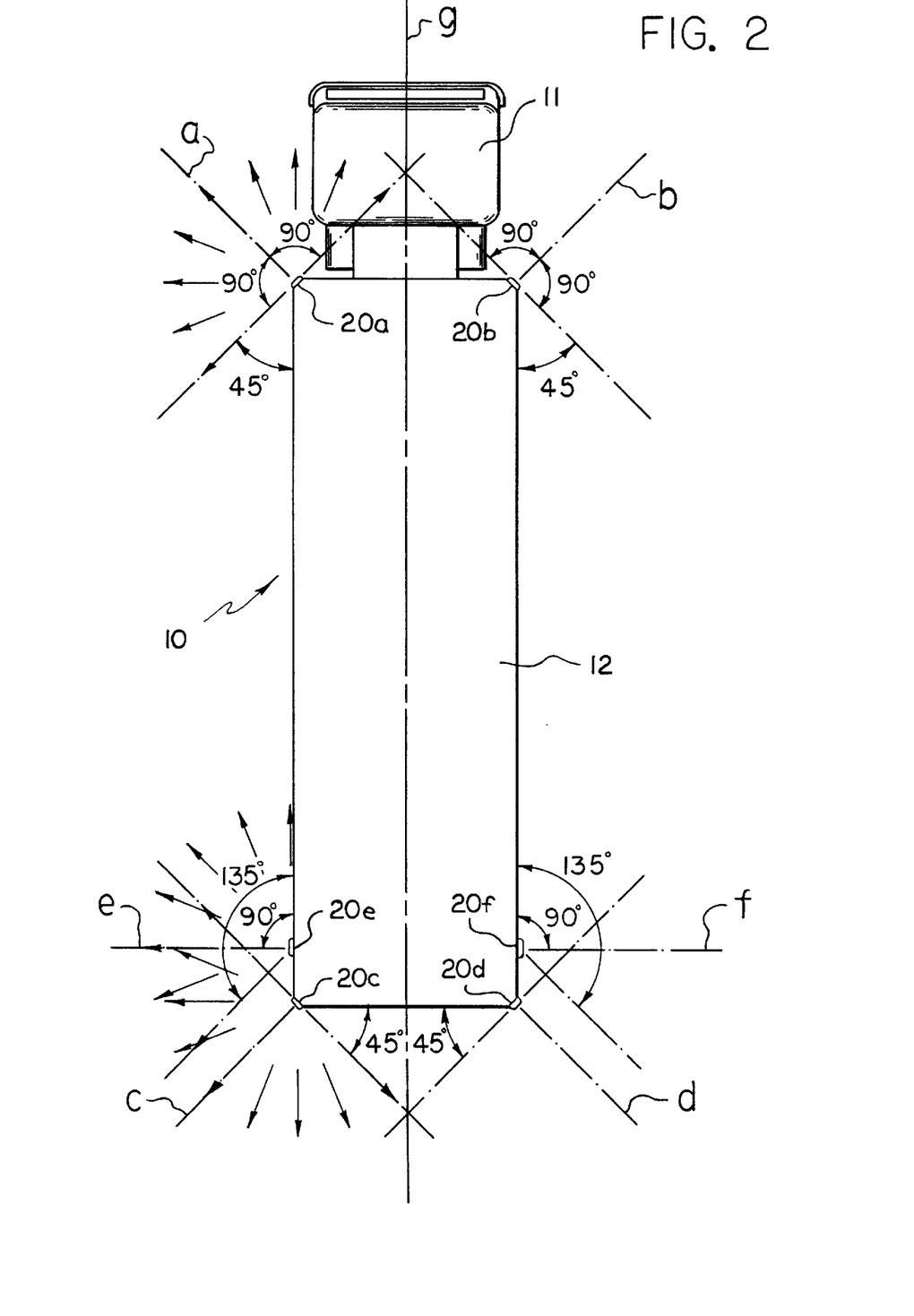
FIG. 2 is a top view of the tractor-trailer shown in FIG. 1, and illustrating the placement of the combination light assemblies on the vehicle and angular distribution of light produced by the assemblies.

The tractor-trailer of FIG. 1 is shown in top view in FIG. 2, which illustrates placement of light assemblies 20a, 20b, 20c, 20d, 20e and 20f on various parts of the truck. All assemblies are identical except for placement. Assemblies 20a, 20b, 20c and 20d are mounted at the top four corners of the trailer, while assemblies 20e and 20f are mounted along the bottom rear edge of the trailer.

Each corner light assembly (20a, 20b, 20c and 20d) is mounted at a 45° angle relative to the longitudinal axis g of the trailer. Longitudinal axis g is parallel to the sides of the trailer. When the tractor is aligned with the trailer, the corner light assemblies are also mounted at a 45° angle relative to the direction of travel of the vehicle. Each of light assemblies 20a, 20b, 20c and 20d are designed to emit light in a 180° arc relative to its mounting axis. Each assembly 20a, 20b, 20c and 20d is mounted at an axis which is 45° relative to axis g; whereas assemblies 20e and 20f are mounted perpendicularly to axis g. For example, assembly 20a is mounted at an axis a relative to the trailer (at a 45° angle relative to axis g), and emits light in an arc which spans 90° on either side of axis a. The same is true of assemblies 20b, 20c and 20d. Thus, it is seen that assembly 20a emits light over the front of the cab, and also emits light at an angle to the side of the trailer, with the entire span of light emitted equal to 180°. For illustration of how each assembly distributes light, the light beams for assemblies 20a, 20c and 20e are illustrated by directional arrows in FIG. 2.

FIG. 2 also illustrates the tracking function of the light assembly of the invention. Tracking lights 20e and 20f are modified embodiments of the light assembly shown as 20a, 20b, 20c and 20d. Light assemblies 20e and 20f emit light over a 135° angle, 90° to the front of their respective mounting axes e and f, and 45° to the rear. The tracking lights are typically mounted toward the rear of the trailer, along the bottom edge, as shown in FIG. 1. The tracking lights function to assist the driver in recognizing where the rear of the trailer is when backing or maneuvering.

Figure 3:
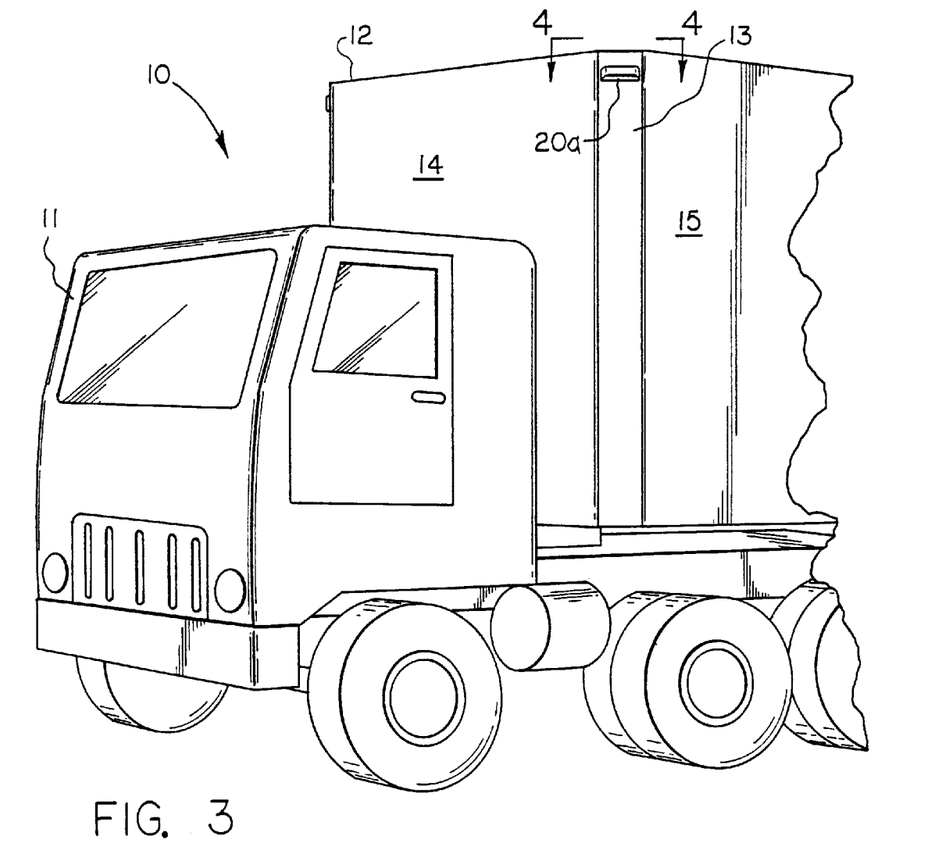
FIG. 3 is a fragmentary perspective view of the front of the tractor-trailer combination shown in FIG. 1, illustrating placement of one of the combination light assemblies of the invention.

FIG. 3 illustrates the position of the light assembly on the trailer. Trailer 11 is shown to have a chamfered surface 13, which is made at a 45° angle relative to front surface 14 and side surface 15 of trailer 12. It is not necessary that the trailer have a chamfered or beveled surface, but it is preferable that the light assembly of the invention be mounted at a 45° angle relative to the longitudinal axis of the trailer. This can be accomplished either by mounting the assembly to a chamfered surface or by modifying the mounting structure of the assembly.

Figure 4:
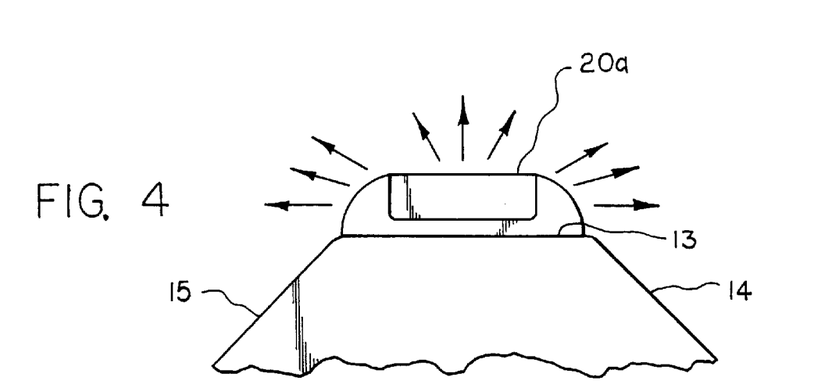
FIG. 4 is a fragmentary top view of the front driver-side corner of the trailer shown in FIG. 3, illustrating placement of the combination light assembly thereon, and also showing schematically the 180° span of light emitted from the light assembly.

FIG. 4 is a fragmentary top view of the front driver-side corner of the trailer, taken generally along plane 4—4 in FIG. 3, illustrating placement of the combination light assembly thereon, and also showing schematically (by arrows) the 180° span of light emitted from the assembly.

Figure 5:
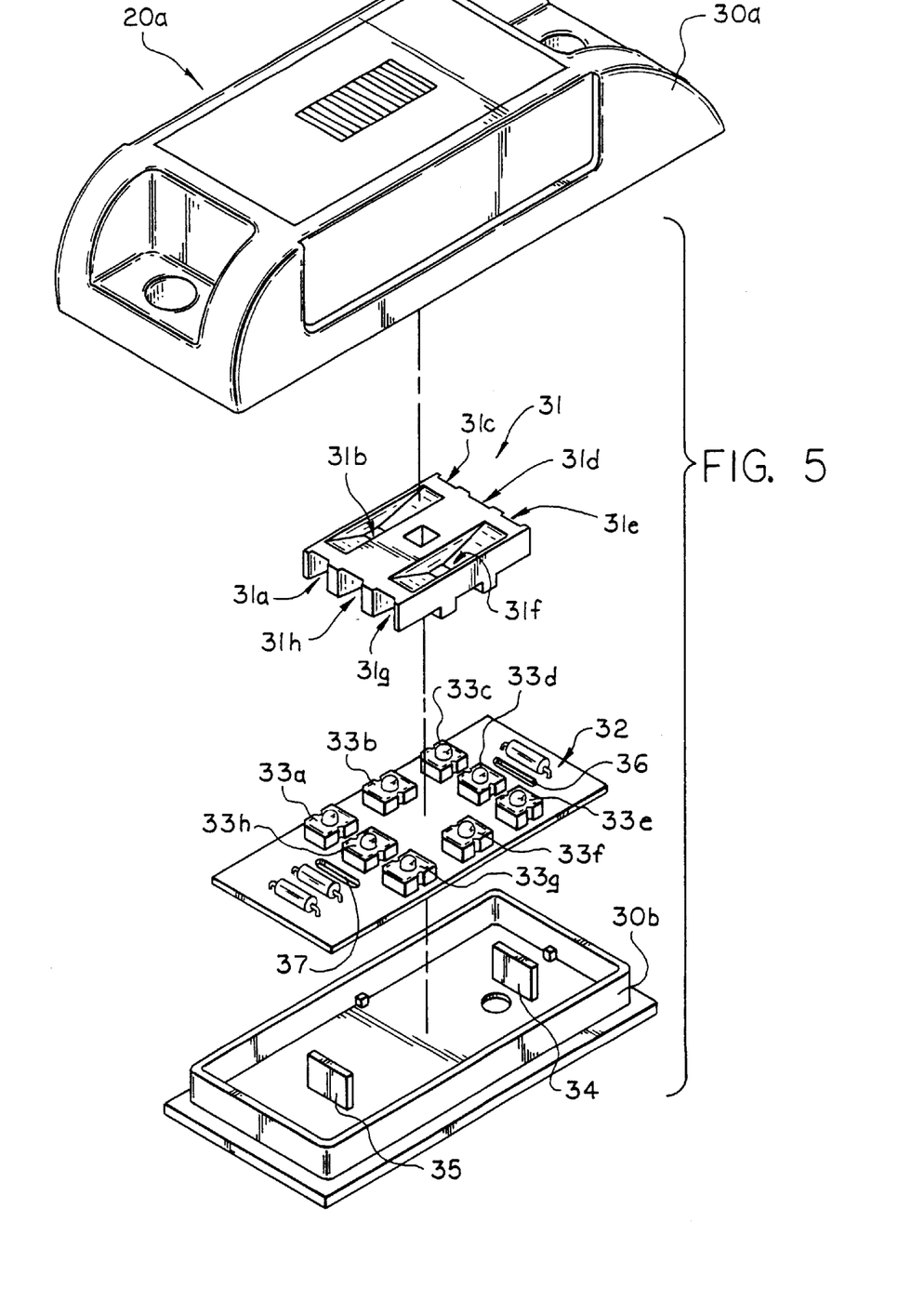
FIG. 5 is an exploded perspective view of the light assembly shown in FIG. 4.

The light assembly is shown in exploded perspective view in FIG. 5. The assembly is shown to include a housing which comprises top member 30a and bottom member 30b, light directing member 31 and substrate 32. In a preferred embodiment, the substrate is a printed circuit board. Mounted to the circuit board are a plurality of light emitting diodes (LEDs). Although the LEDs could be mounted in a variety of patterns, in the embodiment shown in FIG. 5, the LEDs are arranged in a rectangle. The embodiment shown comprises eight LEDs 33a–33h. Extensions 34 and 35 of bottom housing member 30b align with slots 36 and 37, respectively, in circuit board 32, to align the circuit board within the housing. The circuit board may be secured in the housing by any suitable means, such as by encapsulation. The coloring of the housing may vary; however, in a preferred embodiment, the coloring of the housing may include, but is not limited to, transparent, translucent, amber or colorless. Light directing element 31 contains eight light directing compartments 31a–31h which align with and function to direct light emitted by LEDs 33a–33h, respectively. The light directing element is secured directly to the circuit board by any suitable means.

Figure 6:
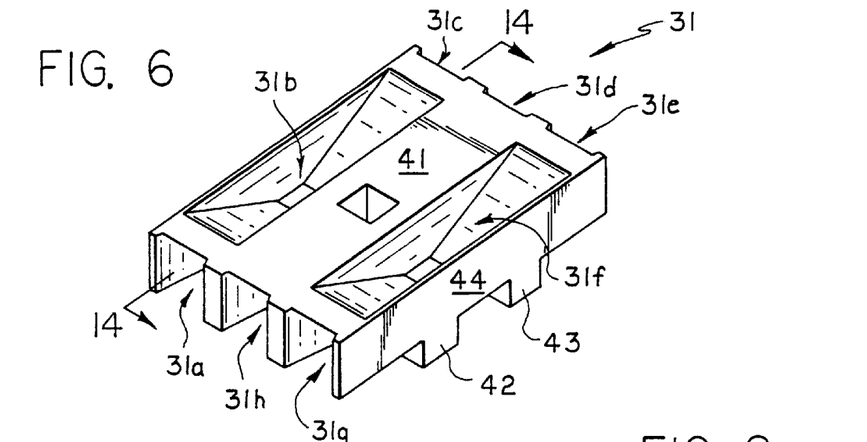
FIG. 6 is a perspective view of the light directing element shown in FIG. 5.

Light directing element 31 is shown in perspective in FIG. 6. The light directing element is seen to comprise eight (8) reflecting compartments 31a–31h. Compartments 31b and 31f are on the top side of the light directing element whereas compartments 31a, 31c, 31d, 31e, 31g and 31h are on the underside of the light directing element. Light directing element 31 further comprises top planar surface 41 and side planar surface 44 as well as supporting legs 42 and 43. Legs 42 and 43 function to support the body of the light directing element and also to elevate the element above the bases of the LEDs on the circuit board.

Figure 7:
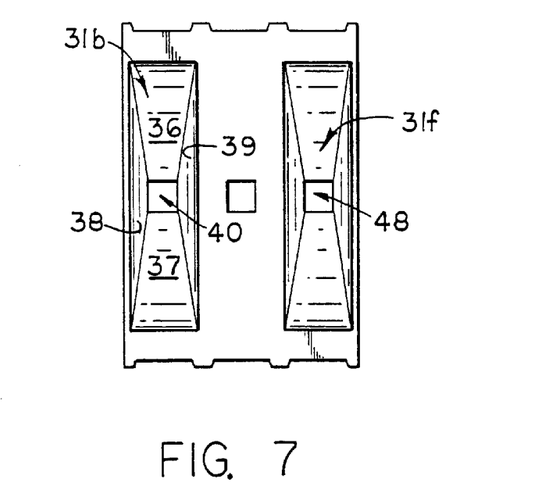
FIG. 7 is a top view of the light directing element shown in FIG. 6.

FIG. 7 is a top view of the light directing element of FIG. 6. This view shows more clearly illustrates reflecting compartments 31b and 31f. Each of these compartments is shown to comprise a four-sided "well". Light reflecting compartment 31b, for example, comprises side walls 36, 37, 38 and 39. Aperture 40 accommodates LED 33b shown in FIG. 5. Light reflecting compartment 31f is similar to reflecting compartment 31b, and aperture 48 accommodates LED 33f. The side walls of compartment 31b and 31f are coated with a reflective material such as white or silver paint, etc., although the light directing element may be made of a naturally reflective material as well. Side walls 36 and 37 permit light to be emitted from the LED in a wide beam whereas side walls 38 and 39 tend to reflect light in a narrower beam.

Figure 8:
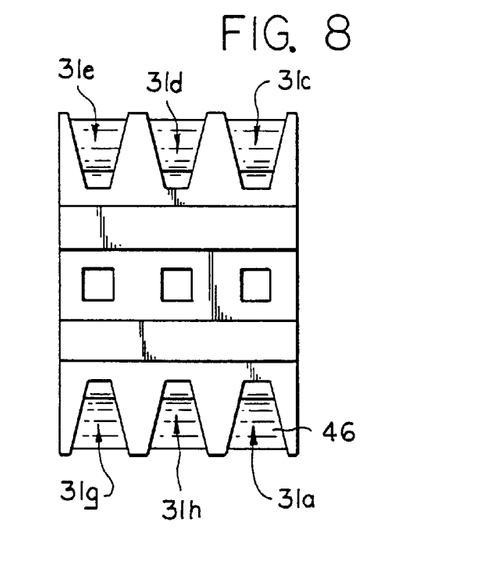
FIG. 8 is a bottom view of the light directing element shown in FIG. 6.

FIG. 8 is a bottom view of the light directing element shown in FIG. 6 which shows light reflecting compartments 31a, 31c, 31d, 31e, 31g, and 31h in more detail. As viewed from the bottom the reflecting compartments are shown to be generally trapezoidal in shape.

Figure 9:
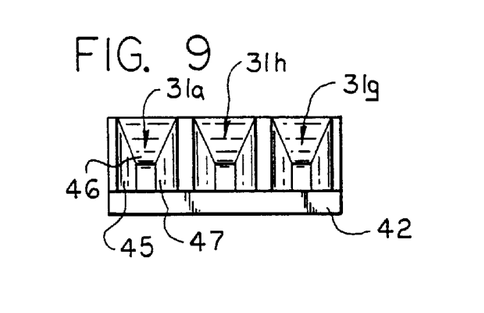
FIG. 9 is an end two-dimensional view of the light directing element in FIG. 6.

Adverting now to FIG. 9, reflecting compartment 31a, 31h, and 31g are shown in a left hand end view of the directing element shown in FIG. 6. Reflecting compartment 31a is shown to comprise side walls 45 and 47 and ceiling 46. Ceiling 46 rises from the interior of the compartment up towards planar surface 41 (shown in FIG. 6). Side walls 45 and 47 also slope outwardly toward the opening of the reflective compartment.

Figure 10:
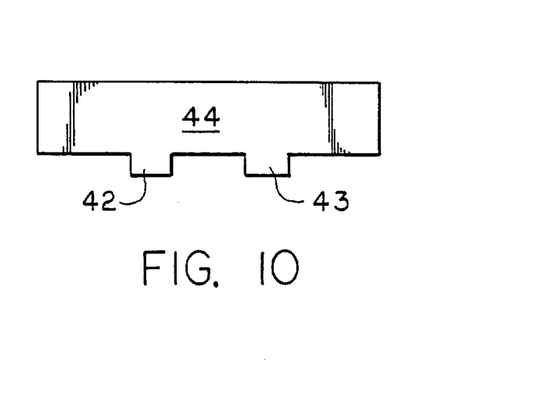
FIG. 10 is a side two-dimensional view of the light directing element in FIG. 6.

FIG. 10 is a right hand side view of the light directing element shown in FIG. 6, illustrating planar side surface 44 and support legs 42 and 43.

Figure 11:
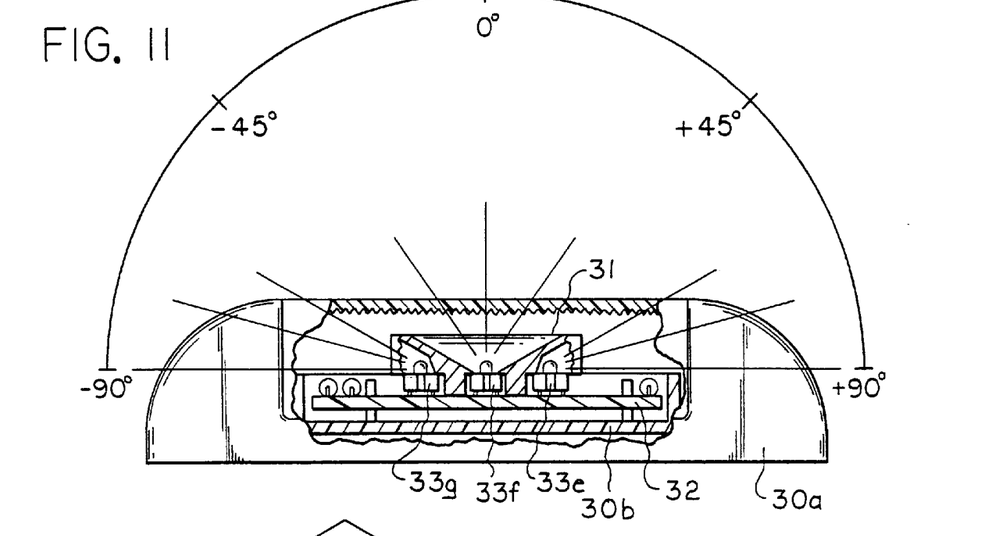
FIG. 11 is a side view of the light assembly shown in FIG. 4, with part of the housing cut away to illustrate how the light directing element of the invention distributes light from the assembly.

The assembled light assembly is shown in operation in fragmentary side view in FIG. 11. As shown in this drawing, light from LED 33f in the center of the circuit board leaves the light assembly substantially unreflected whereas light from LEDs 33g and 33e leave the assembly at each end thereof and some of this light is reflected whereas some of this light is direct. FIG. 11 illustrates clearly how the light emanating from the light assembly spans an angle of $2\pi$ radians (180°). Of course, the span is $2\pi$ radians in two dimensions and can be as great as $2\pi$ steradians in three dimensions.

To better illustrate the light directing function of the invention, reference is made to FIGS. 14–19.

Figure 14:
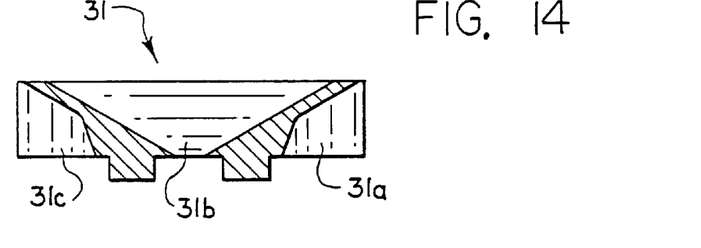
FIG. 14 is a cross-sectional view of the element shown in FIG. 6, showing compartments 31a, 31b, and 31c.

FIG. 14 is a cross-sectional view of the light directing element shown in FIG. 6. This view illustrates the general shape and structure of light directing compartments 31a, 31b and 31c. Of course, light directing compartments 31g, 31f and 31e are identical in shape and structure to compartments 31a, 31b and 31c, respectively. Compartments 31d and 31h are identical in shape and structure to compartment 31a.

Figures 15, 16A, 16B, 16C:
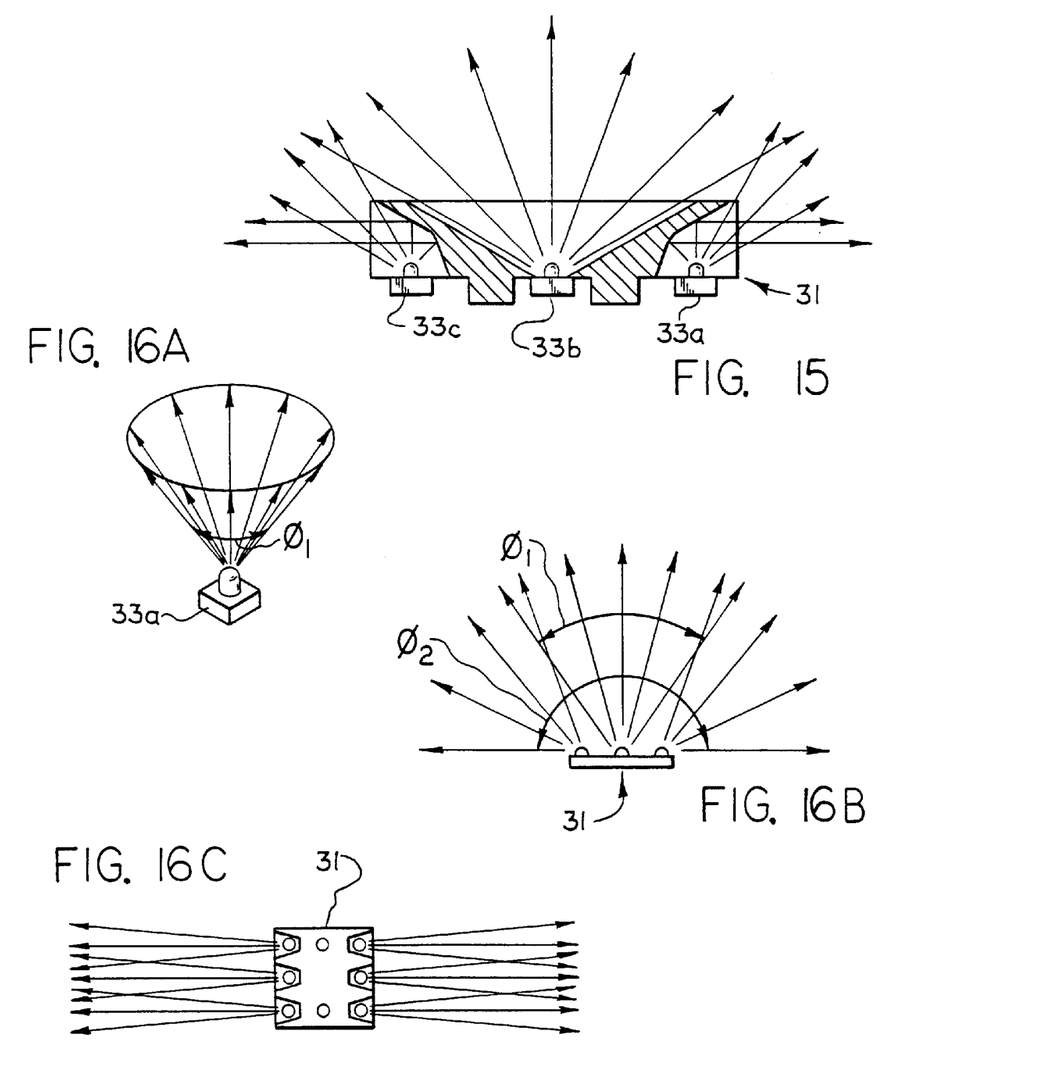
FIG. 15 is an enlarged, cross-sectional view similar to that of FIG. 14, except showing schematically how the light is reflected and directed by the light directing element.
FIG. 16a illustrates schematically the distribution of light emitted from a conventional light emitting diode.
FIG. 16b illustrates schematically how the light directing element of the invention distributes light from a plurality of light emitting diodes in a solid angle of $2\pi$ steradians.
FIG. 16c is a top view of the light directing element shown in FIG. 16b illustrating schematically how light is directed away from the element.

FIG. 15 is an enlarged cross-sectional schematic view of the light directing element shown in FIG. 14, showing how light is reflected and directed by the light directing element. Some light emitted from the LEDs escapes each compartment unreflected, whereas some light is reflected from each compartment as well. Also, light from adjacent compartments overlap to form a solid beam of light created by the LEDs in combination with the directing element.

The light distribution of a conventional LED is illustrated schematically in FIG. 16A. As illustrated in the drawing, each LED on the circuit board emits light outwardly in a substantially conical pattern, the cone defining a solid first angle $\phi_1$ which is less than $2\pi$ steradians. In fact, some LEDs emit light in what may be described as a narrow cone pattern. This normal distribution of light is unacceptable for meeting the tracking and clearance requirements. FIG. 16B is a side view of element 31 whereas FIG. 16C is a top view. As shown in FIGS. 16B and 16C, the light directing element functions to direct the light emitted from the plurality of LEDs into a beam which subtends from the light sources and spans an arc (in at least two dimensions) which is greater than the first angle. In other words, if the spatial angle of the conical light beam emitted from the LED is equal to $\phi_1$, then the beam emitted from the light directing element would span an angle $\phi_2$ which is greater than $\phi_1$. It should be noted that $\phi_2$ may be as great as $2\pi$ radians in two dimensions and $2\pi$ steradians in three dimensions. Thus it is seen that the light directing element changes both the shape of the emitted beam, as well as the angle of distribution. In a preferred embodiment the beam emanating from the light directing element (and the plurality of light sources) spans $2\pi$ radians in two dimensions.

Figure 17:
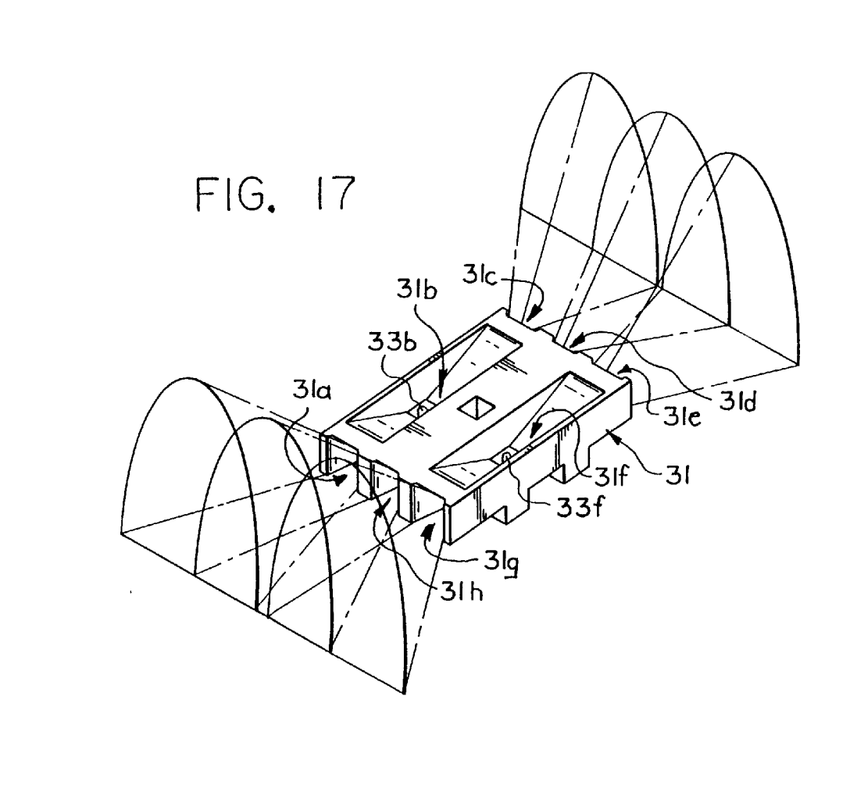
FIG. 17 is another perspective view of the light directing element of the invention, illustrating schematically how light leaves compartments 31a, 31c, 31d, 31e, 31g and 31h.
Figure 18:
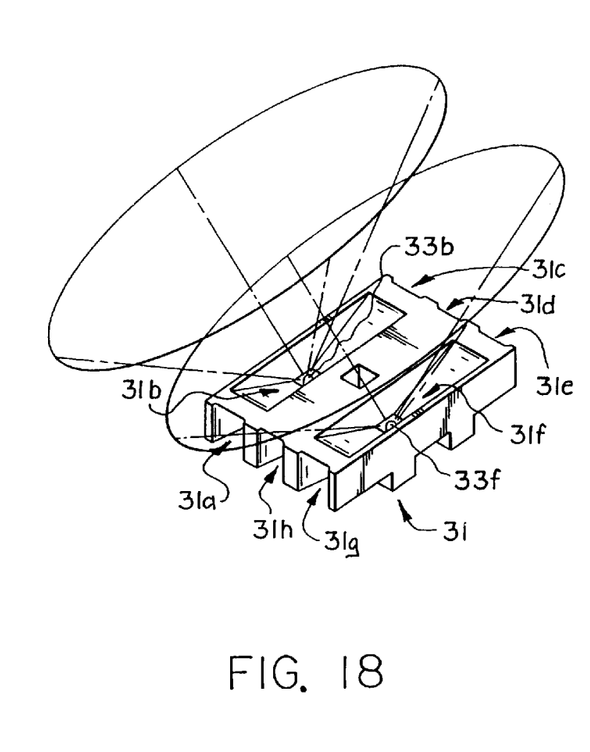
FIG. 18 is a view similar to that of FIG. 17, and illustrating schematically how light leaves compartments 31b and 31f.
Figure 19:
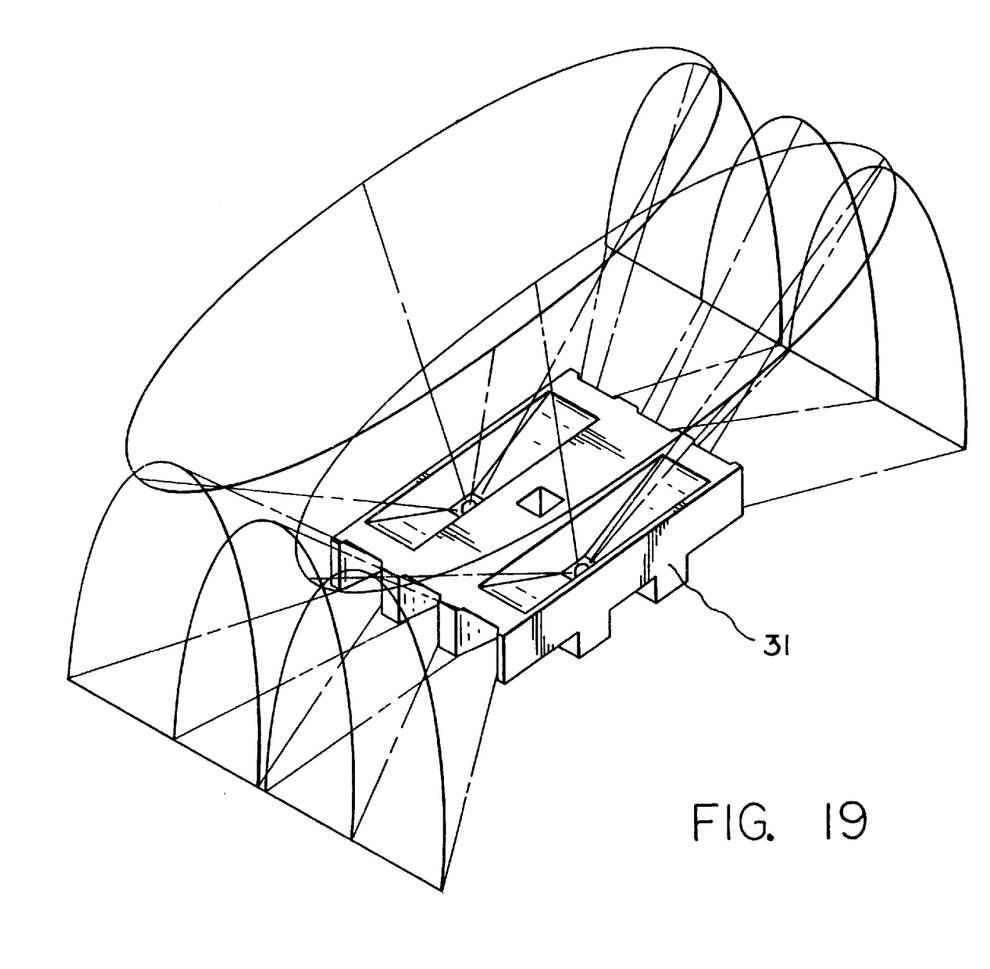
FIG. 19 is a composite view of the element shown in FIGS. 17 and 18, illustrating in perspective how light leaves the various light directing compartments of the light directing element of the invention.

FIGS. 17–18 further illustrate the light distribution produced by light directing element 31. FIG. 17 illustrates, schematically, the three-dimensional light pattern produced by light emitting diodes within end compartments 31a, 31c, 31d, 31e, 31g and 31h. Although the light pattern of each compartment is shown to be semi-elliptical, this is for illustration purposes only. The drawing is intended to show that the light from the three adjacent end compartments overlaps. FIG. 18 illustrates, schematically, the three-dimensional light pattern produced by light emitting diodes within top compartments 31b and 31f. Again, the elliptical patterns are merely for illustration, and do not necessarily illustrate the actual patterns. The point is that the geometry of the top chambers affects the shape of the beam of light. Finally, FIG. 19 is a composite view of the element shown in FIGS. 17 and 18. This drawing clearly shows how the light beam defines a solid angle which spans $2\pi$ radians in two dimensions.

Figure 12:
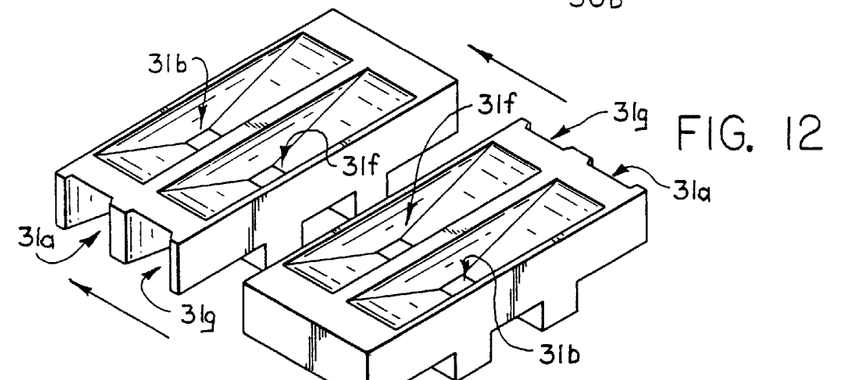
FIG. 12 illustrates an alternative embodiment of the light directing element of the invention, this embodiment comprising two identical light directing elements placed back-to-back, and each element containing two light directing compartments.
Figure 13:
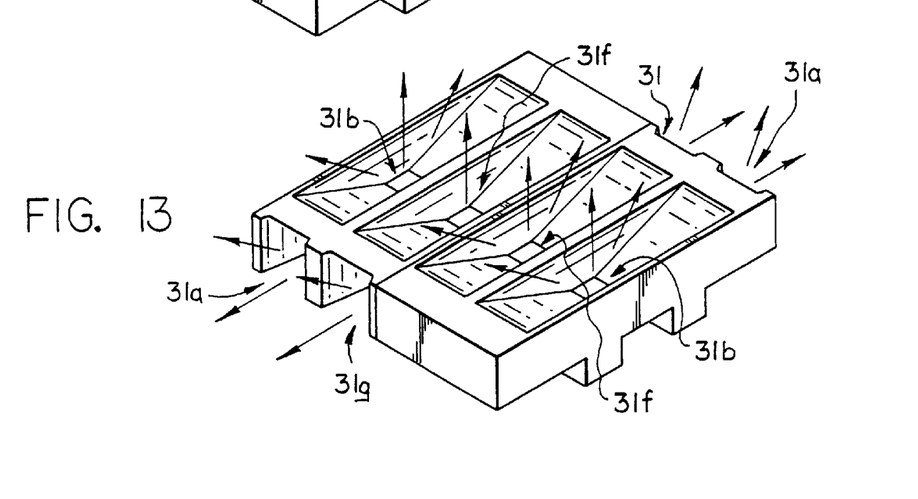
FIG. 13 illustrates how light is directed and distributed by the alternative light directing element combination shown in FIG. 12.

An alternative embodiment of the light directing element 31 is shown in perspective in FIGS. 12 and 13. This embodiment comprises only four compartments 31a, 31b, 31f and 31g. Two such identical elements may be juxtaposed adjacent one another as shown in FIGS. 12 and 13 to produce light which spans an angle of $2\pi$ radians in two dimensions as shown in FIG. 13.

Thus, the objects of the invention are efficiently obtained. Although the invention is described by reference to specific preferred embodiments, it is clear that variations can be made without departing from the spirit of the invention as claimed.

What I claim is:

1. A light assembly, comprising:
    at least one planar substrate containing a plurality of light sources mounted thereto, each of said light sources, lying in the same plane, operatively arranged to emit light outwardly from said source, wherein most of said light is emitted at a first solid angle which is less than $2\pi$ steradians and wherein each of said at least one planar substrate lies in the same plane; and,
    at least one light directing element operatively arranged to direct light emitted from said plurality of light sources into a beam which subtends from said plurality of sources at a second solid angle which is greater than said first angle in at least two directions.

2. A light assembly as recited in claim 1 wherein said second solid angle is also less than or equal to $2\pi$ steradians.

3. A light assembly as recited in claim 1 wherein said light directing element reflects only some of the total light produced by said plurality of light sources.

4. A light assembly as recited in claim 1 wherein said plurality of light sources comprises three light sources arranged in a straight row.

5. A light assembly as recited in claim 1 wherein said light directing element reflects some of the light emitted from each light source.

6. A light assembly as recited in claim 1 wherein each of said light sources is a light emitting diode.

7. A light assembly as recited in claim 1 further comprising a housing containing said planar substrate, said plurality of light sources and said light directing element.

8. A light assembly as recited in claim 7 wherein said housing is transparent.

9. A light assembly as recited in claim 7 wherein said housing is translucent.

10. A light assembly as recited in claim 7 wherein said housing is colorless.

11. A light assembly as recited in claim 7 wherein said housing is amber in color.

12. A light assembly as recited in claim 7 wherein said housing is a lens.

13. A light assembly as recited in claim 4 wherein said light directing element contains three compartments, one for each light source, wherein two of said compartments reflect some of the light produced by their respective light sources on each end of the row into two beams, each of which subtends in an acute angle ranging from the plane of said substrate, and said third compartment directs the light from the remaining light source into a three-dimensional beam which subtends in an angle in two dimensions equal to $2\pi$ radians minus the sum of the angles of the other two beams.

14. A light assembly as recited in claim 1 wherein said plurality of light sources comprises eight (8) light sources arranged in a rectangle.

15. A light assembly as recited in claim 10 wherein said light directing element contains eight compartments, one for each light source, wherein three of said compartments reflect some of the light produced by their respective light sources on one end of each row into three three-dimensional beams, each of which subtends, in two dimensions, in a first acute angle ranging front the plane of said substrate, wherein three of said compartments reflect some of the light produced by their respective light sources on an opposite each of each row into three three-dimensional beams, each of which subtends, in two dimensions, in a second acute angle ranging from the plane of said substrate, and the remaining two compartments direct the light from the remaining two light sources into two three-dimensional beams, each of which spans an angle in two dimensions equal to $2\pi$ radians minus the sum of the first and second angles of the other six beams.

16. A light assembly as recited in claim 11 wherein said light sources are light emitting diodes.

17. A light assembly as recited in claim 1 wherein said planar substrate is a circuit board.

18. A light assembly as recited in claim 6 wherein said light emitting diodes are encapsulated.

19. A light assembly as recited in claim 1 wherein each of said plurality of light sources emits light in a narrow cone pattern.

20. A light assembly, comprising:
    at least one planar substrate containing a plurality of light sources mounted perpendicularly thereto, each of said light sources, lying in the same plane, operatively arranged to emit light outwardly from each of said sources in a narrow cone and wherein each of said at least one planar substrate lies in the same plane; and,
    at least one light directing element mounted to said planar substrate and operatively arranged to direct said light emitted from each of said plurality of light sources in a three-dimensional beam which subtends, in at least two dimensions, from said light directing element in an angle which spans approximately 180°.

\* \* \* \* \*